United States Patent
Gao et al.

(10) Patent No.: US 11,868,637 B2
(45) Date of Patent: Jan. 9, 2024

(54) FLEXIBLE RAID SPARING USING DISK SPLITS

(71) Applicant: EMC IP HOLDING COMPANY LLC, Hopkinton, MA (US)

(72) Inventors: Kunxiu Gao, Boxborough, MA (US); Kuolin Hua, Natick, MA (US); Evgeny Malkevich, Newton, MA (US)

(73) Assignee: Dell Products L.P., Hopkinton, MA (US)

( * ) Notice: Subject to any disclaimer, the term of this patent is extended or adjusted under 35 U.S.C. 154(b) by 242 days.

(21) Appl. No.: 16/901,413

(22) Filed: Jun. 15, 2020

(65) Prior Publication Data

US 2021/0389896 A1   Dec. 16, 2021

(51) Int. Cl.
| | |
|---|---|
| *G06F 11/10* | (2006.01) |
| *G06F 3/06* | (2006.01) |
| *G11B 20/18* | (2006.01) |
| *G06F 11/20* | (2006.01) |

(52) U.S. Cl.
CPC .......... *G06F 3/0647* (2013.01); *G06F 3/0619* (2013.01); *G06F 3/0644* (2013.01); *G06F 3/0689* (2013.01); *G06F 11/1092* (2013.01); *G06F 11/2094* (2013.01); *G11B 20/1816* (2013.01); *G06F 2201/82* (2013.01)

(58) Field of Classification Search
CPC ............. G06F 11/1092; G06F 11/2094; G06F 3/0689; G06F 3/0644; G06F 3/0619; G06F 3/0647
See application file for complete search history.

(56) References Cited

U.S. PATENT DOCUMENTS

| | | | | |
|---|---|---|---|---|
| 5,974,503 A | * | 10/1999 | Venkatesh | G06F 11/2023 714/E11.073 |
| 7,085,953 B1 | * | 8/2006 | Hsu | G06F 11/1076 714/E11.034 |
| 7,647,526 B1 | * | 1/2010 | Taylor | G06F 11/1662 714/6.32 |
| 8,049,980 B1 | * | 11/2011 | Emami | G11B 20/1833 714/6.21 |
| 10,126,988 B1 | * | 11/2018 | Han | G06F 3/0604 |
| 10,140,041 B1 | * | 11/2018 | Dong | G06F 3/0619 |
| 2002/0066050 A1 | * | 5/2002 | Lerman | G06F 11/1076 714/E11.034 |

(Continued)

*Primary Examiner* — Yolanda L Wilson
(74) *Attorney, Agent, or Firm* — Anderson Gorecki LLP

(57) ABSTRACT

In a storage system that implements RAID (D+P) protection groups a drive subset initially has (D+P) drives plus a spare drive with (D+P) splits. Spare splits are distributed with drive index and split index adjacency such that no single drive or split index contains multiple spare splits. When the drive subset is incremented by one drive a group of selected splits are relocated to the new drive based on drive index and split index adjacency such that no single drive or split index contains multiple members of a new protection group. If one of the drives is failing or fails, then an adjusted spare split index value is calculated for each protection group member on that drive so that the protection group members are rebuilt or relocated without placing more than one member of any protection group on a single drive. Adjusted spare split index values may be calculated in steps using the data split indices in ascending order and the largest drive indices in descending order.

20 Claims, 13 Drawing Sheets

Drive Subset 300

(56) References Cited

U.S. PATENT DOCUMENTS

2006/0085674 A1\* 4/2006 Ananthamurthy .. G06F 11/1088
714/E11.034
2013/0254589 A1\* 9/2013 Sonobe ............... G06F 11/1088
714/6.1

\* cited by examiner

|    | S1 | S2 | S3 | S4 | S5 |
|----|----|----|----|----|----|
| D1 | 1  | 2  | 3  | 4  | 5  |
| D2 | 1  | 2  | 3  | 4  | 5  |
| D3 | 1  | 2  | 3  | 4  | 5  |
| D4 | 1  | 2  | 3  | 4  | 5  |
| D5 | 1  | 2  | 3  | 4  | 5  |
| D6 |    |    |    |    |    |

Figure 4A

|    | S1 | S2 | S3 | S4 | S5 |
|----|----|----|----|----|----|
| D1 | 1  | 2  | 3  | 4  | 5  |
| D2 | 1  | 2  | 3  | 4  | X  |
| D3 | 1  | 2  | 3  | X  | 5  |
| D4 | 1  | 2  | X  | 4  | 5  |
| D5 | 1  | X  | 3  | 4  | 5  |
| D6 | X  | 2  | 3  | 4  | 5  |

Figure 4B

|    | S1 | S2 | S3 | S4 | S5 |
|----|----|----|----|----|----|
| D1 | 1  | 2  | 3  | 4  | 5  |
| D2 | 1  | 2  | 3  | 4  | X  |
| D3 | 1  | 2  | 3  | X  | 6  |
| D4 | 1  | 2  | X  | 6  | 5  |
| D5 | 1  | X  | 6  | 4  | 5  |
| D6 | X  | 6  | 3  | 4  | 5  |
| D7 | 6  | 2  | 3  | 4  | 5  |

Figure 6A

|    | S1 | S2 | S3 | S4 | S5 |
|----|----|----|----|----|----|
| D1 | 1  | 2  | 3  | 4  | 5  |
| D2 | 1  | 2  | 3  | 4  | X  |
| D3 | 1  | 2  | 3  | X  | 6  |
| D4 | 1  | 2  | X  | 6  | 7  |
| D5 | 1  | X  | 6  | 7  | 5  |
| D6 | X  | 6  | 7  | 4  | 5  |
| D7 | 6  | 7  | 3  | 4  | 5  |
| D8 | 7  | 2  | 3  | 4  | 5  |

Figure 6B

|    | S1 | S2 | S3 | S4 | S5 |
|----|----|----|----|----|----|
| D1 | 1  | 2  | 3  | 4  | 5  |
| D2 | 1  | 2  | 3  | 4  | X  |
| D3 | 1  | 2  | 3  | X  | 6  |
| D4 | 1  | 2  | X  | 6  | 7  |
| D5 | 1  | X  | 6  | 7  | 8  |
| D6 | X  | 6  | 7  | 8  | 5  |
| D7 | 6  | 7  | 8  | 4  | 5  |
| D8 | 7  | 8  | 3  | 4  | 5  |
| D9 | 8  | 2  | 3  | 4  | 5  |

Figure 7

|    | S1 | S2 | S3 | S4 | S5 |
|----|----|----|----|----|----|
| D1 | 1  | 2  | 3  | 4  | 5  |
| D2 | 1  | 2  | 3  | 4  | X  |
| D3 | 1  | 2  | 3  | X  | 6  |
| D4 | 1  | 2  | X  | 6  | 7  |
| D5 | 1  | X  | 6  | 7  | ⑧  |
| D6 | X  | 6  | ⑦  | 8  | 5  |
| D7 | 6  | 7  | 8  | 4  | 5  |
| ~~D8~~ | ~~7~~ | ~~8~~ | ~~3~~ | ~~4~~ | ~~5~~ |
| D9 | 8  | 2  | 3  | 4  | 5  |

Figure 8

|      | S1 | S2 | S3 | S4 | S5 |
|------|----|----|----|----|----|
| D1   |    |    |    |    |    |
| D2   |    |    |    |    | X  |
| D3   |    |    |    | X  | 6  |
| D4   |    |    | X  | 6  | 7  |
| D5   |    | X  | 6  | 7  | 8  |
| D6   | X  | 6  | 7  | 8  | 5  |
| D7   | 6  | 7  | 8  | 4  | 5  |
| ~~D8~~ | ~~7~~ | ~~8~~ | ~~3~~ | ~~4~~ | ~~5~~ |
| D9   | 8  | 2  | 3  | 4  | 5  |
| D10  | 1  | 2  | 3  | 4  | 5  |
| D11  | 1  | 2  | 3  | 4  |    |
| D12  | 1  | 2  | 3  |    |    |
| D13  | 1  | 2  |    |    |    |
| D14  | 1  |    |    |    |    |

Figure 9

| Split Index | 1 | 2 | 3 | 4 | 5 |
|---|---|---|---|---|---|
| Protection Group | 7 | 8 | 3 | 4 | 5 |
| Drive Index Range | 4-8 | 5-9 | 8-12 | 7-11 | 6-10 |
| Largest Drive Index | 8 | 9 | 12 | 11 | 10 |
| Adjusted Spare Split Index | 5 | 4 | 1 | 2 | 3 |

Figure 10

FLEXIBLE RAID SPARING USING DISK SPLITS

TECHNICAL FIELD

The subject matter of this disclosure is generally related to electronic data storage, and more particularly to scalable protection groups with spares.

BACKGROUND

Protection groups help to avoid data loss by enabling a failing or failed member to be reconstructed. In a typical data storage system, the disk drives are organized as members of redundant array of independent drives (RAID) protection groups. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails. A failed member drive is reconstructed on a spare drive.

It is sometimes necessary to increase the total storage capacity of a data storage system because the existing storage capacity becomes fully utilized. The storage capacity of a data storage system that uses individual drives as protection group members is increased by adding a new protection group, i.e. (D+P) drives for a RAID (D+P) protection group. For example, a storage system that implements RAID-5 (4+1) may be scaled-up in increments of five new drives. Similarly, a RAID-5 (3+1) may be scaled-up in increments of four new drives. One drawback of scaling storage capacity in increments of (D+P) new drives is that it may introduce excess storage capacity that will not be utilized within a reasonable timeframe. This drawback is becoming more troublesome as the storage capacity of individual drives increases due to technological advancements. More specifically, as the storage capacity and cost of drives increases, the amount of excess storage capacity and cost associated with adding D+P drives to a storage system also increase, particularly for larger values of (D+P).

SUMMARY

All examples, aspects and features mentioned in this document can be combined in any technically possible way.

In accordance with some implementations a method comprises: from a set of drives of a storage system, creating a drive subset of (D+P) plus spare sequentially indexed drives for implementation of protection groups that have D data members and P parity members, each of the drives having (D+P) sequentially indexed splits; and creating a group of spare splits that exhibit split index and drive index adjacency by relocating selected protection group members to the spare drive such that no split index and no drive contain multiple spare splits. Some implementations comprise creating each of the protection groups using a single split index. Some implementations comprise adding a new drive to the drive subset and relocating selected protection group members characterized by split index and drive index adjacency to splits of the new drive. Some implementations comprise creating a new protection group using splits vacated by relocating the selected protection group members. Some implementations comprise relocating or rebuilding protection group members from a failing or failed one of the drives to the spare splits such that none of the drives contain multiple members of any of the protection groups. Some implementations comprise identifying the protection groups of the splits on the failing or failed drive. Some implementations comprise determining, for each identified protection group, the drives that contain the members of the protection group. Some implementations comprise determining a largest drive index for each identified protection group. Some implementations comprise calculating adjusted spare split indices to which the protection group members from the failing or failed one of the drives are relocated or rebuilt by using the largest drive index to select a split index that is used as the adjusted spare split index for the member of the protection group associated with the largest drive index.

In accordance with some implementations an apparatus comprises: a plurality of non-volatile drives; a plurality of interconnected compute nodes that manage access to the drives; and a drive manager configured to create a drive subset of (D+P) plus spare sequentially indexed using selected ones of the drives for implementation of protection groups that have D data members and P parity members, each of the selected drives having (D+P) sequentially indexed splits; and creating a group of spare splits that exhibit split index and drive index adjacency by relocating selected protection group members to the spare drive such that no split index and no drive contain multiple spare splits. In some implementations the drive manager is configured to create each of the protection groups using a single split index. In some implementations a new drive is added to the drive subset and the drive manager is configured to relocate selected protection group members characterized by split index and drive index adjacency to splits of the new drive. In some implementations the drive manager is configured to create a new protection group using splits vacated by relocating the selected protection group members. In some implementations the drive manager is configured to relocate or rebuild protection group members from a failing or failed one of the drives to the spare splits such that none of the drives contain multiple members of any of the protection groups. In some implementations the drive manager is configured to identify the protection groups of the splits on the failing or failed drive. In some implementations the drive manager is configured to determine, for each identified protection group, the drives that contain the members of the protection group. In some implementations the drive manager is configured to determine a largest drive index for each identified protection group. In some implementations the drive manager is configured to calculate adjusted spare split indices to which the protection group members from the failing or failed one of the drives are relocated or rebuilt by using the largest drive index to select a split index that is used as the adjusted spare split index for the member of the protection group associated with the largest drive index.

In accordance with some implementations a computer-readable storage medium stores instructions that when executed by a computer cause the computer to perform a method for using a computer system to create spares, the method comprising: from a set of drives of a storage system, creating a drive subset of (D+P) plus spare sequentially indexed drives for implementation of protection groups that have D data members and P parity members, each of the drives having (D+P) sequentially indexed splits; and creating a group of spare splits that exhibit split index and drive index adjacency by relocating selected protection group members to the spare drive such that no split index and no drive contain multiple spare splits. In some implementations the method further comprises calculating adjusted spare split indices to which protection group members from a failing or failed one of the drives are relocated or rebuilt by using a largest drive index to select a split index that is used as an adjusted spare split index for the member of the protection group associated with the largest drive index.

Other aspects, features, and implementations may become apparent in view of the detailed description and figures.

BRIEF DESCRIPTION OF THE FIGURES

FIGS. 4A and 4B are matrix representations of the drive subset of FIG. 3 that illustrate creation and distribution of spare splits.

FIGS. 6A, 6B and 7 illustrate redistribution of existing protection group members and creation of new protection groups when additional new drives are added.

FIG. 8 illustrates how use of same-split-index spares violates protection group rules when some protection group members are stored on different split indices.

FIG. 9 illustrates member adjacency when the drive subset is scaled-up as described above.

FIG. 10 illustrates a table of values for calculating adjusted spare split indices for rebuilding protection group members on spare splits when some protection group members are stored on different split indices.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
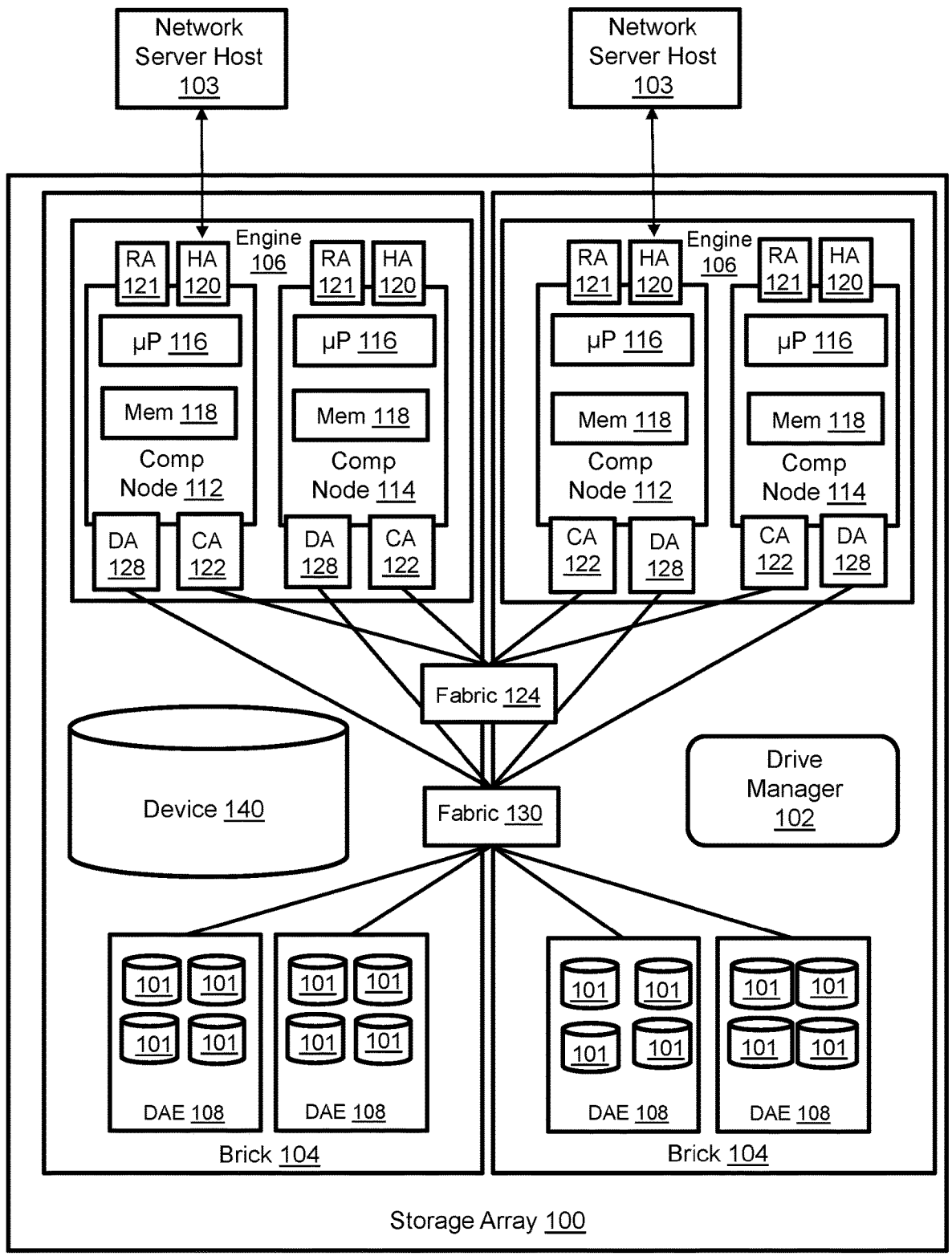
FIG. 1 illustrates a storage array with a drive manager that implements scalable protection groups with spares.

FIG. 1 illustrates a storage array 100 with a drive manager 102 that implements scalable protection groups with spares. Each protection group is scalable in single drive increments. The storage array is one example of a storage area network (SAN), which is one example of a data storage system in which the drive manager could be implemented. The storage array 100 is depicted in a simplified data center environment supporting two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A backend connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with the hosted application instances running on the hosts 103 is maintained on the managed drives 101. The managed drives 101 are not discoverable by the hosts but the storage array creates a logical storage device 140 that can be discovered and accessed by the hosts. Without limitation, the logical storage device may be referred to as a storage object, source device, production volume, production device, or production LUN, where the logical unit number (LUN) is a number used to identify logical storage volumes in accordance with the small computer system interface (SCSI) protocol. From the perspective of the hosts 103, the logical storage device 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the logical storage device 140 and the managed drives 101 in order to process IOs from the hosts.

Figure 2:
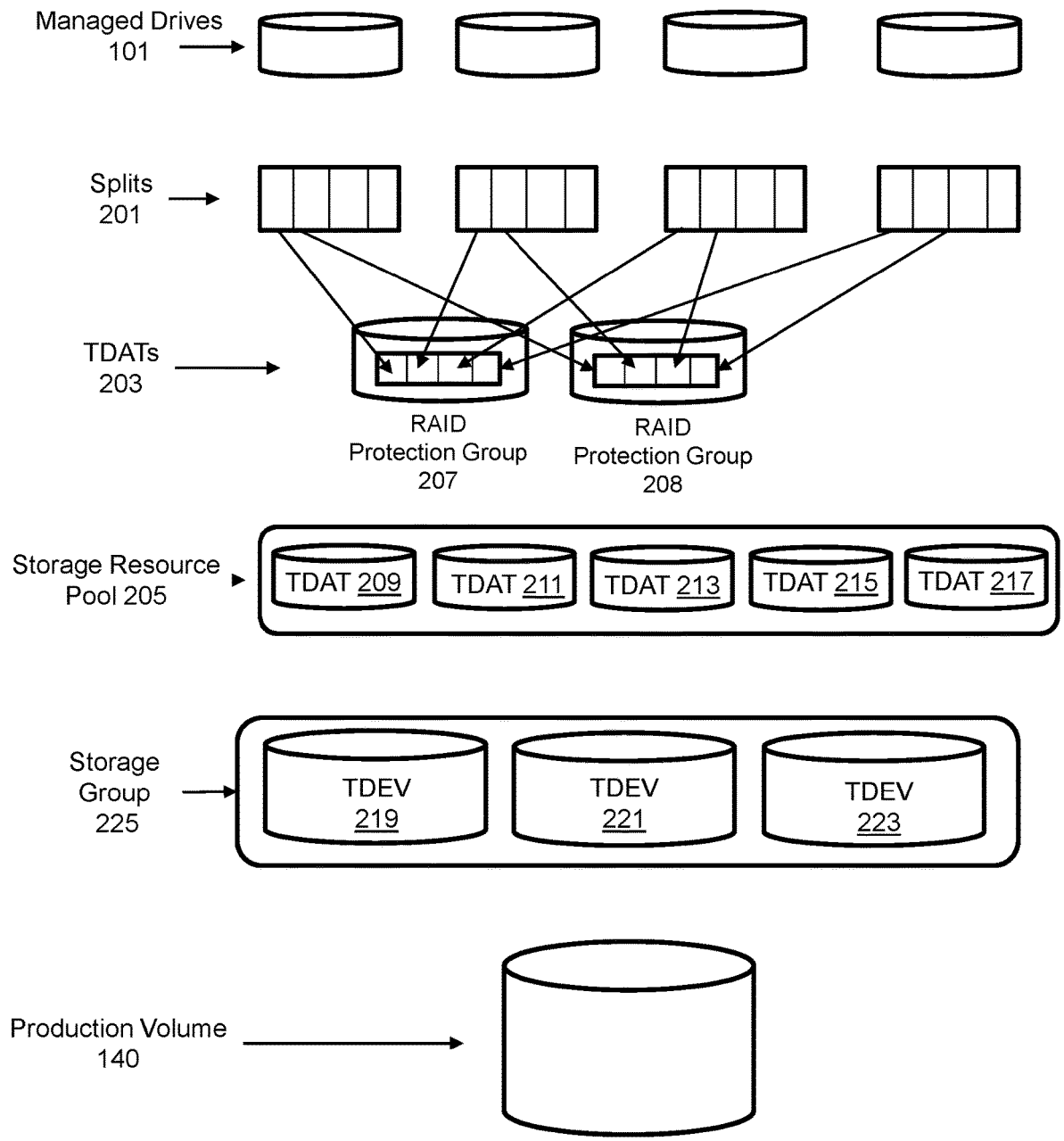
FIG. 2 illustrates layers of abstraction between the managed drives and the production volume.

FIG. 2 illustrates layers of abstraction between the managed drives 101 and the production volume 140. The smallest unit of storage capacity that can be processed by a managed drive 101 is a sector. Different types of managed drives may be characterized by different sector sizes but for context and without limitation the sector size of all managed drives may be 2 KB. IOs between the compute nodes and the managed drives may be in larger allocation units such as tracks that are a fixed size that may be an integer multiple of the sector size. For example, an 10 may read or write the sectors of a track. The managed drives 101 are each organized into logical splits 201 of equal storage capacity. Selection of split storage capacity is a design implementation and, for context and without limitation, may be some fraction or percentage of the capacity of a managed drive equal to an integer multiple of sectors greater than 1. Each split includes a contiguous range of logical addresses. Groups of splits 201 from multiple managed drives are used to create data devices (TDATs) 203. The splits on each TDAT are organized as members of a protection group, e.g. RAID protection groups 207, 208. A storage resource pool 205, also known as a "data pool" or "thin pool," is a collection of TDATs 209, 211, 213, 215, 217 of the same emulation and RAID protection type, e.g. RAID-5. In some implementations all TDATs in a drive group are of a single RAID protection type and all are the same size (storage capacity). Logical thin devices (TDEVs) 219, 221, 223 are created using TDATs. The TDATs and TDEVs are accessed using tracks as the allocation unit. For context, and without limitation one track may be 128 KB. Multiple TDEVs are organized into a storage group 225. The production volume 140 is created from a single storage group 225. Host application data, which is stored in blocks on the production volume 140, is mapped to tracks of the TDEVs, which map to sectors of the managed drives. Regardless of the specific allocation unit capacities selected, a track is larger than both the sectors and the fixed size blocks used in communications between the storage array and the hosts to access the production volume.

Figure 3:
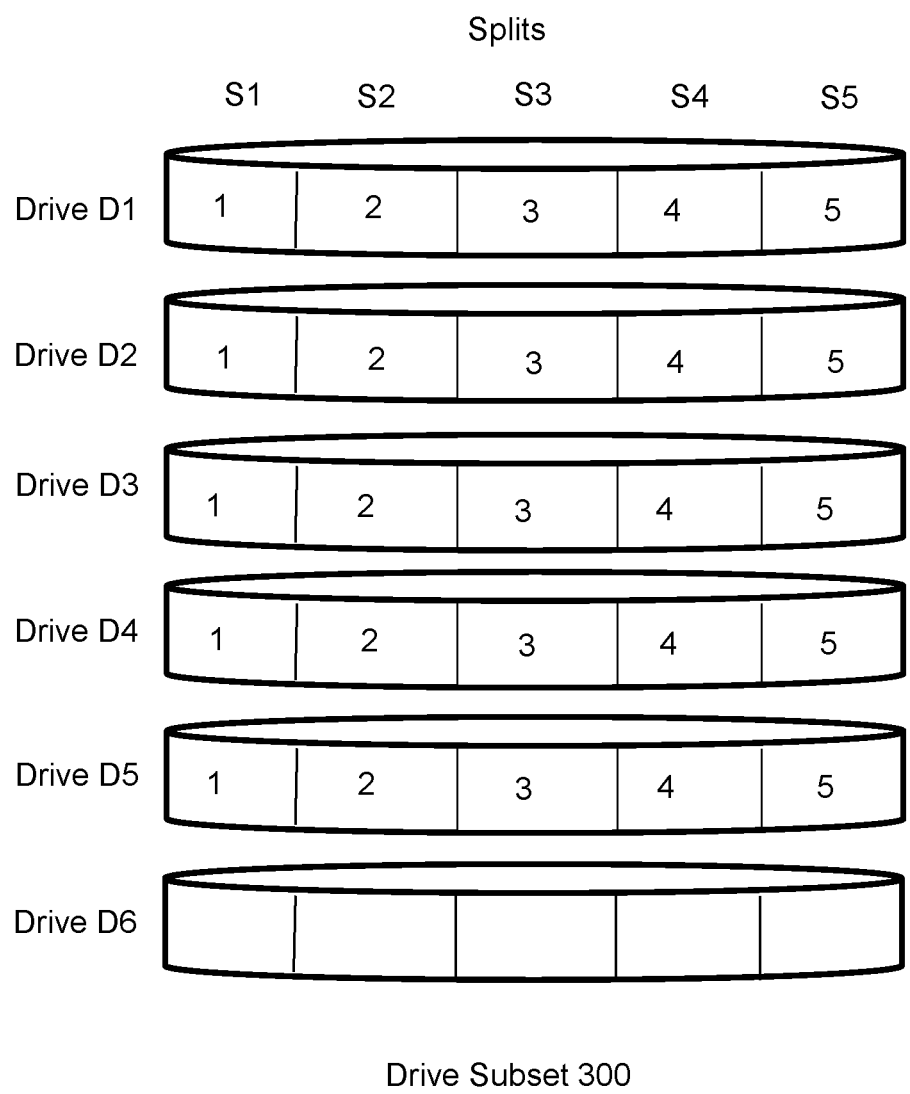
FIG. 3 illustrates implementation of multiple RAID (D+P) protections groups on splits of a subset of the managed drives.

FIG. 3 illustrates implementation of multiple RAID (D+P) protections groups 1-5 on splits of a subset 300 of the managed drives. The storage array includes multiple drive subsets similar to drive subset 300. Each drive subset may initially be created with (D+P) drives plus a spare drive, each having (D+P) splits. A RAID-5 (4+1) implementation is shown so there are five (D+P) drives D1-D5 and a spare drive D6 on which five splits S1-S5 are created. The RAID-5 (4+1) protection groups 1-5 are each based on a single split index. Specifically, the members of protection group 1 are each in the single split index S1 of drives D1-D5, the members of protection group 2 are each in the single split index S2 of drives D1-D5, the members of protection group 3 are each in the single split index S3 of one of drives D1-D5, the members of protection group 4 are each in the single split index S4 of drives D1-D5, and the members of protection group 5 are each in the single split index S5 of drives D1-D5. Operation of the drive manager will be described beginning with the illustrated drive subset 300, but this should not be viewed as a limitation.

FIGS. 4A and 4B are matrix representations of the drive subset 300 of FIG. 3 that illustrate creation and distribution of spare splits X. For a storage array with N drives, the splits in the storage array can be represented as M matrices of N rows and R columns, where R=D+P and each drive is divided into M*R splits. Each matrix may have the same split distribution pattern and use the same algorithm for assigning spares. The illustrated matrix is therefore representative of multiple matrices and drive subsets within the storage array. Moreover, matrices are just one example of data structures that may be used by the drive manager to represent the drive subsets. In a matrix in which split and drive indices are sequential, the spare splits X are distributed in a pattern characterized by split-index and drive index adjacency such that only one spare split resides on any single drive and split index. In the illustrated example the pattern includes inversely related drive/split index pairings D6/S1, D5/S2, D4/S3, D3/S4, and D2/S5. The indices are inversely related because the drive index decreases as the split index increases but would be possible to use declining split indices with increasing drive indices. In the illustrated example a starting split for distribution of spares is located at split index S1 of the spare drive D6. However, other starting split locations might be used. Diagonally adjacent splits are selected relative to the starting split and made available for spare splits by relocating the protection group members from those splits to the same split index location on the spare drive. For example, the protection group 2 member at split S2 of drive D5 is moved to split S2 of the spare drive D6, the protection group 3 member at split S3 of drive D4 is moved to split S3 of the spare drive D6, the protection group 4 member at split S4 of drive D3 is moved to split S4 of the spare drive D6, and the protection group 5 member at split S5 of drive D2 is moved to split S5 of the spare drive D6. Spare splits X are created in the starting location split and vacated splits. As a result, spare splits X are distributed from split S1 of the drive D6 to split S5 of drive D2 along a diagonal without drive index or split index overlap. As will be explained below, the distribution of splits without split-index and drive-index overlap facilitates scaling of storage capacity in single drive increments and rebuilding or reconstruction using the spare splits.

Figure 5:
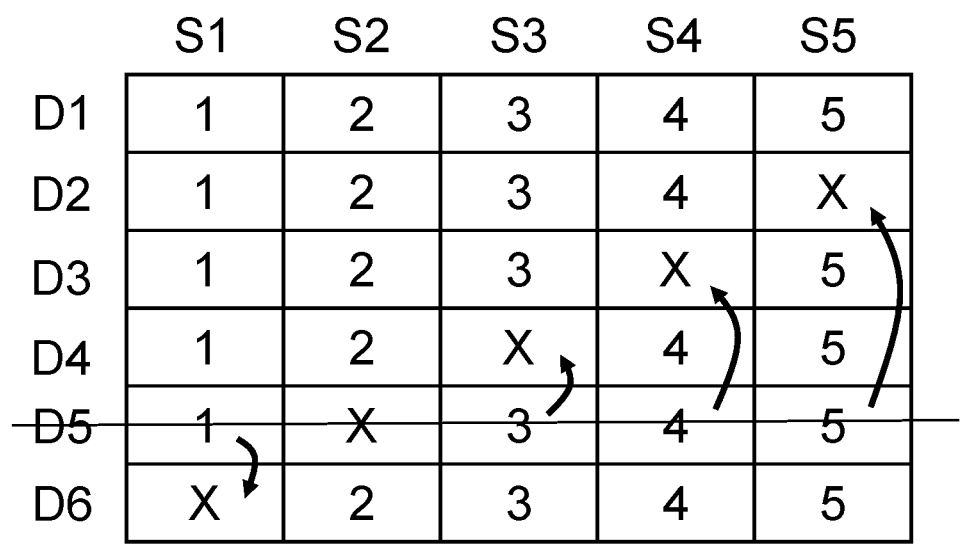
FIG. 5 illustrates use of same-split-index spares in response to failure of a drive.

FIG. 5 illustrates use of same-split-index spares in response to failure of a drive of the drive subset. In the illustrated example drive D5 fails. Rather than reconstructing the failed drive D5 on a spare drive the protection group members on drive D5 are relocated or rebuilt using the spare splits X distributed on drives D2-D6. Specifically, each protection group member on the failed drive is relocated or rebuilt on the spare split having the same split index as the protection group member. For example, protection group member 1 is on split S1 of drive D5 so it is relocated or rebuilt on split S1 of drive D6. Similarly, protection group member 3 is on split S3 of drive D5 so it is relocated or rebuilt on split S3 of drive D4, protection group member 4 is on split S4 of drive D5 is relocated or rebuilt on split S4 of drive D3, and protection group member 5 is on split S5 of drive D5 is relocated or rebuilt on split S5 of drive D2. It is possible to use the same-split-index spares in the illustrated case because the drive subset contains only single-split-index protection groups, i.e. each protection group exists in only one split index. However, as the drive subset is scaled-up at least some of the protection groups are distributed across multiple split indices.

FIGS. 6A, 6B and 7 illustrate redistribution of existing protection group members and creation of new protection groups when additional new drives are added. In FIG. 6A a single new drive D7 has been added. Drive D7 is organized into (D+P) splits and all but one of those splits are used to accommodate relocated protection group members so that a new protection group 6 can be implemented. Because there are not enough splits to implement protection group 6 members at a single split index the protection group members are distributed across multiple split indices such that no single drive or split index includes more than one member of protection group 6. Further, members of the protection group are distributed in a pattern characterized by split-index and drive index adjacency, along a diagonal that is parallel and adjacent to the spare splits X. In order to make splits available to form the new protection group 6 along the diagonal adjacent to the spare splits X the protection group members on drives D3-D6 that are adjacent to the spare splits are relocated to the same-split-indices of the new drive D7. For example, protection group member 2 is relocated from drive D6, split S2 to drive D7, split S2. Similarly, protection group member 3 is relocated from drive D5, split S3 to drive D7, split S3, protection group member 4 is relocated from drive D4, split S4 to drive D7, split S4, and protection group member 5 is relocated from drive D3, split S5 to drive D7, split S5. The vacated splits are then populated with members of protection group 6.

In FIG. 6B a new drive D8 has been added. Because there are not enough splits to implement a new protection group 7 with members at a single split index the protection group members are distributed across multiple split indices such that no single drive or split index includes more than one member of protection group 7. Further, members of the protection group are distributed in a pattern characterized by split-index and drive index adjacency, along a diagonal that is parallel and adjacent to the members of protection group 6. In order to make splits available to form the new protection group 7 along a diagonal adjacent to the splits of protection group 6 the protection group members on drives D4-D7 that are adjacent to the splits containing members of protection group 6 are relocated to the same-split-indices of the new drive D8. For example, protection group member 2 is relocated from drive D7, split S2 to drive D8, split S2. Similarly, protection group member 3 is relocated from drive D6, split S3 to drive D8, split S3, protection group member 4 is relocated from drive D5, split S4 to drive D8, split S4, and protection group member 5 is relocated from drive D4, split S5 to drive D8, split S5. The vacated splits are then populated with members of protection group 7.

In FIG. 7 a new drive D9 has been added. Because there are not enough splits to implement a new protection group 8 with members at a single split index the protection group members are distributed across multiple split indices as described above. In order to make splits available to form a new protection group 8 along a diagonal adjacent to the splits of protection group 7 the protection group members on drives D5-D8 that are adjacent to the splits containing members of protection group 7 are relocated to the same-split-indices of the new drive D9. For example, protection group member 2 is relocated from drive D8, split S2 to drive D9, split S2. Similarly, protection group member 3 is relocated from drive D7, split S3 to drive D9, split S3, protection group member 4 is relocated from drive D6, split S4 to drive D9, split S4, and protection group member 5 is relocated from drive D5, split S5 to drive D9, split S5. The vacated splits are then populated with members of protection group 8.

Scaling of the drive subset in the manner described above has potential advantages. For example, it enables scaling of storage capacity in single drive increments. Further, it maintains protection groups 1-5 on single-split-indices. When the drive subset has enough drives to be split into two drive subsets then the single-split-index protection groups 1-5 may be maintained on the same split-away drive subset following the split, thereby recreating the original distribution pattern shown in FIG. 3, which can be repeatedly scaled and split. However, the diagonally distributed protection group members complicate use of the spare splits as will be described below.

FIG. 8 illustrates how use of same-split-index spares X violates protection group rules when some protection group members are stored on different split indices. In the illustrated example drive D8 fails. Members of the single-split-index protection groups 1-5 can be relocated or rebuilt to the spare X having the same split indices as the member being relocated, but relocating or rebuilding multi-split-index protection group member 7 from split S1 of drive D8 to split S1 of drive D6 violates protection group rules because two members of protection group 7 would then be stored on drive D6. Similarly, relocating or rebuilding multi-split-index protection group member 8 from split S2 of drive D8 to split S2 of drive D5 violates protection group rules because two members of protection group 8 would then be stored on drive D5. It would be possible to heuristically calculate a redistribution of protection group members that complies with protection group member rules, but the latency caused by such a calculation would be problematic due to the urgency to reconstruct or relocate protection group members quickly when a drive is failing or fails.

FIG. 9 illustrates protection group member adjacency when the drive set is scaled-up as described above. A deterministic algorithm for relocating or rebuilding protection group members when some protection group members are stored on different split indices takes advantage of the drive-index adjacency of single-split-index protection group members. If drive D9 is considered to be adjacent to drive D1 it can be seen that protection groups 1-5 exhibit drive-index adjacency. For purposes of illustration this can be shown using imaginary drives D10-D14 that contain the members of protection groups 1-5 shifted down from the upper-left triangle of the matrix above the spare splits X. The split and drive indices are used to calculate an adjusted split index to determine where to relocate or rebuild members of the failed drive without violating protection group rules. More particularly, the relationship between higher split indices and lower drive indices is used as an indicator of distance and thus non-overlap. Unlike a heuristic algorithm, the described deterministic algorithm can provide a solution in a single pass, thereby facilitating timely relocation or rebuilding.

FIG. 10 illustrates a table of values for calculating adjusted spare split indices for rebuilding protection group members on spare splits when some protection group members are stored on different split indices. The "split index" row includes a column for each split index in the matrix that represents the drive subset. The "protection group" row indicates the protection group number of the member stored in the corresponding split index of the failed drive (the split index in the same column of the table). For example, a member of protection group 7 is in split index S1 of failed drive D8 (as shown in FIG. 9) so the split index value 1 is in the same column as protection group value 7 in the table. The "drive index range" row indicates the range of drive indices that contain the protection group listed in the column. For example, protection group 7 has members on drives D4 through D8 (as shown in FIG. 9) so the drive index range value 4-8 is in the same column as protection group value 7 in the table. Protection group 3 has members on drives D8 through D12 (as shown in FIG. 9) so the drive index range value 8-12 is in the same column as protection group value 3 in the table. The "largest drive index" row indicates the largest drive index of the drive index range listed in the same column. For example, the largest drive index of the drive index range 4-8 is 8, and the largest drive index of the drive index range 8-12 is 12. The "adjusted spare split index" row indicates the index of the spare split on which the protection group member in the same column will be relocated or rebuilt. For example, protection group member 7 in split index column 1 has an adjusted spare split index value 5 so the protection group member is relocated or rebuilt on the spare in split index 5.

Adjusted spare split index values are calculated in steps using the data split indices and drive indices in inverse order, e.g. data split indices in ascending order and largest drive indices in descending order. More particularly, the drive index is used to select a split index that is used as the adjusted spare split index for the member of the protection group in the same column as the drive index. For example, the largest drive index in the table is 12 and the smallest split index is 1, so the split index value of 1 is the adjusted spare split index value used for the member of protection group 3 which is in the same column as the largest drive index value 12. The second largest drive index in the table is 11 and the second smallest split index is 2, so the split index value 2 is the adjusted spare split index value used for the member of protection group 4 which is in the same column as the largest drive index value 11. Similarly, the third largest drive index in the table is 10 and the third smallest split index is 3, so the split index value 3 is the adjusted spare split index value used for the member of protection group 5 which is in the same column as the largest drive index value 10. The fourth largest drive index in the table is 9 and the fourth smallest split index is 4, so the split index value 4 is the adjusted spare split index value used for the member of protection group 8 which is in the same column as the largest drive index value 9. The fifth largest drive index in the table is 8 and the fifth smallest split index is 5, so the split index value 5 is the adjusted spare split index value used for the member of protection group 7 which is in the same column as the largest drive index value 8. The relationship between higher split indices and lower drive indices is an indicator of distance that avoids placing multiple members of a protection group on a single drive.

Figure 11:
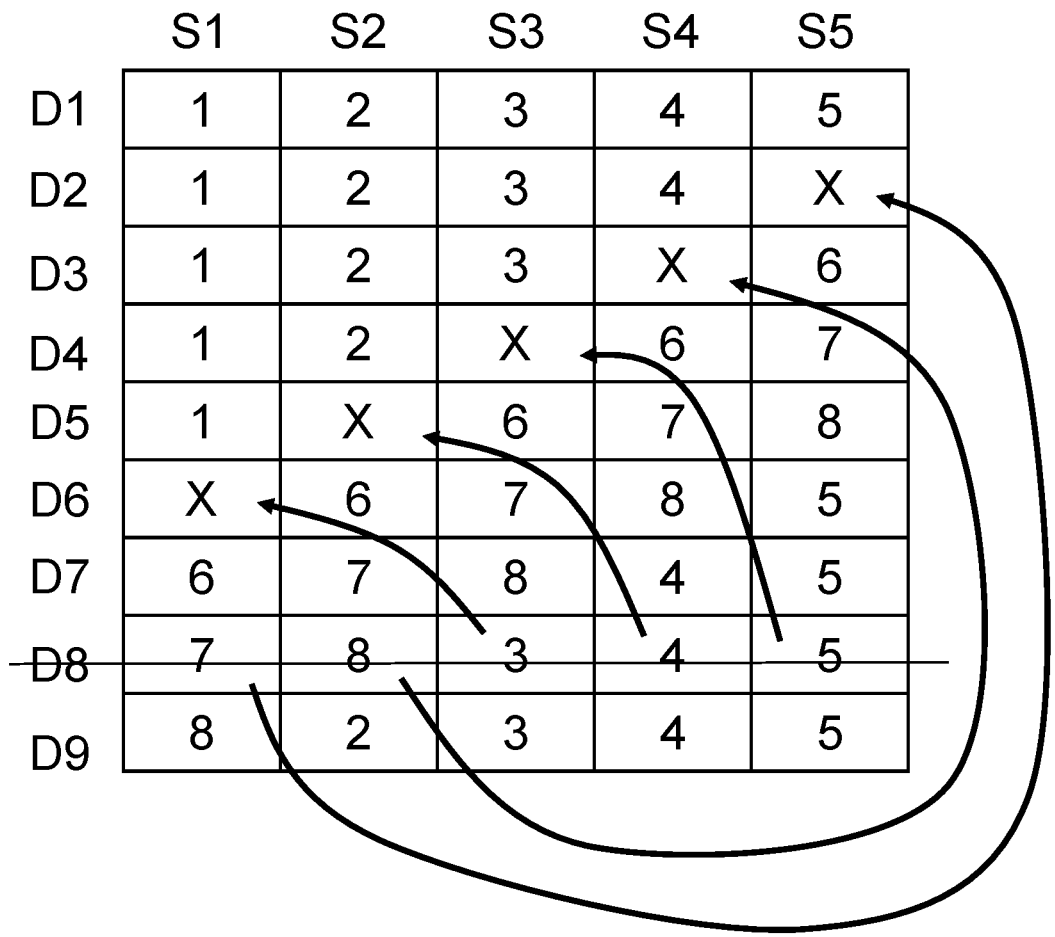
FIG. 11 illustrates relocating or rebuilding splits on spare splits when drive D8 fails.

Referring to FIGS. 10 and 11, based on the calculated adjusted spare split index values, the protection group 7 member on split S1 of drive D8 is relocated or rebuilt on adjusted spare split index 5, and thus split S5 of drive D2. The protection group 8 member on split S2 of drive D8 is relocated or rebuilt on adjusted spare split index 4, and thus split S4 of drive D3. The protection group 3 member on split S3 of drive D8 is relocated or rebuilt on adjusted spare split index 1, and thus split S1 of drive D6. The protection group 4 member on split S4 of drive D8 is relocated or rebuilt on adjusted spare split index 2, and thus split S2 of drive D5. The protection group 5 member on split S5 of drive D8 is relocated or rebuilt on adjusted spare split index 3, and thus split S3 of drive D4. No more than one member of any protection group is located on any single drive.

Figure 12:
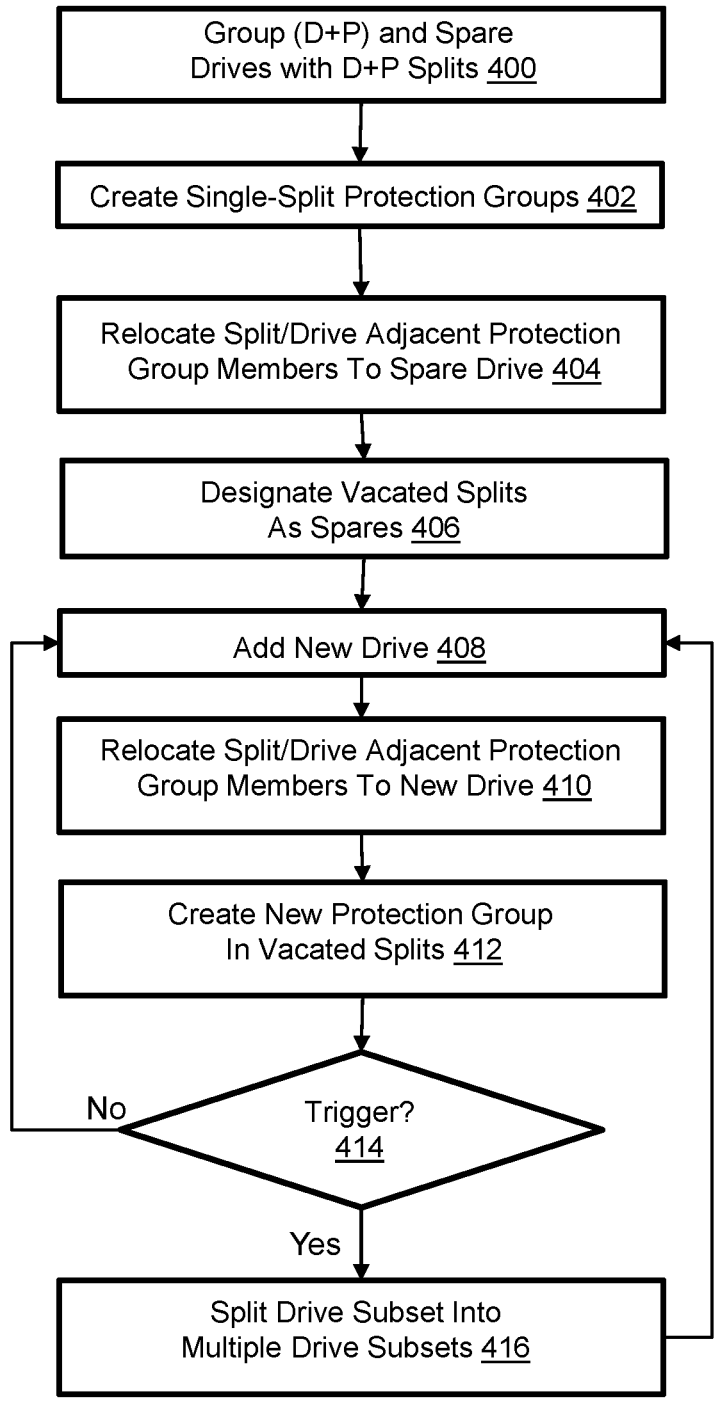
FIG. 12 illustrates a method for scaling storage capacity of the storage array.

FIG. 12 illustrates a method for scaling storage capacity of the storage array. A subset of drives is created from (D+P) drives and a spare drive with (D+P) splits as indicated in step 400. Protection groups are implemented using individual splits as indicated in step 402. More particularly, the members of a given protection group are all located at the same split index (without locating members on the spare drive). Space for spare splits is made available by selecting a starting split and relocating protection group members characterized by split and drive index adjacency relative to the starting split as indicated in step 404. In the matrix representation the relocated protection group members are located along a diagonal. The split of the lowest split index of the spare drive may be used as the starting split. The starting split on the spare drive and the splits vacated by relocation in step 404 are designated as spare splits as indicated in step 406. A new drive is eventually added as indicated in step 408. Space for members of a new protection group is made available by relocating to the new drive a group of protection group members characterized by split and drive index adjacency as indicated in step 410. The lowest split index of the spare drive may be used as the starting split. In the matrix representation the relocated protection group members are located along a diagonal adjacent to the spare splits (or most recently created new protection group along a diagonal). The new protection group is created in the vacated splits as indicated in step 412. If a trigger condition is detected as determined in step 414 then the drive subset is split into multiple drive subsets as indicated in step 416. If the trigger condition is not detected then steps 408 through 414 are repeated, adding another new drive and new protection group located along the next adjacent diagonal. The trigger condition may be based on the number of drives, e.g. a sufficient number to create two independent subsets of (D+P) and spare drives.

Figure 13:
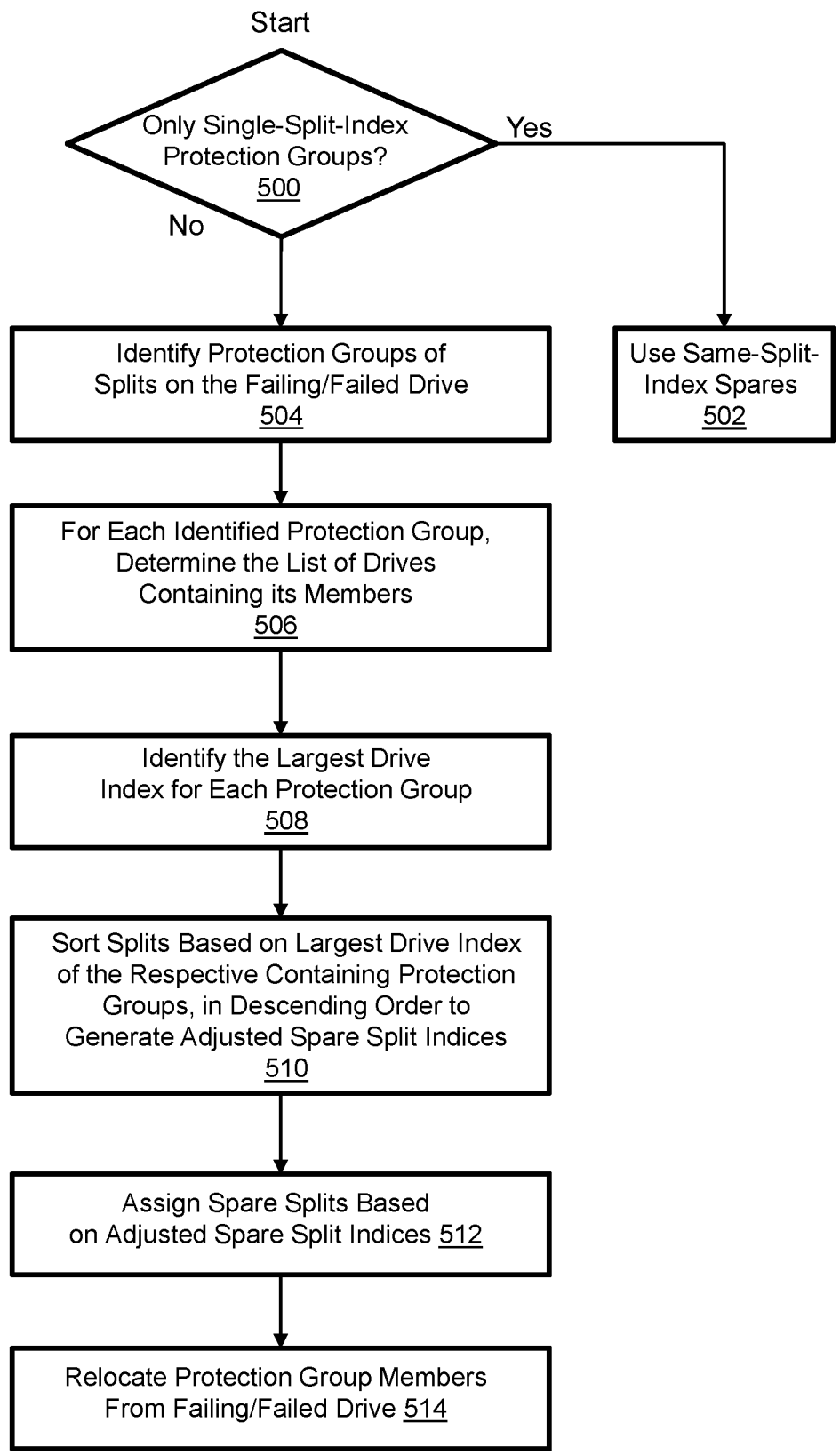
FIG. 13 illustrates a method for relocating or rebuilding protection group members on spare splits.

FIG. 13 illustrates a method for relocating or rebuilding protection group members on spare splits. If the drive subset contains only single-split-index protection groups as determined in step 500 then same-split-index spares are used as indicated in step 502. An example of this scenario is shown in FIG. 5. If the drive subset contains multi-split-index protection groups as determined in step 500 then step 504 is to identify the protection groups of the splits on the failing/failed drive. The identified values may be used to create the "protection group" row in the table shown in FIG. 10. For each identified protection group, a list of the drives that contain members of that protection group is determined as indicated in step 506. The values may be used to create the "drive index range" row in the table shown in FIG. 10. The largest drive index for each identified protection group is identified as indicated in step 508. The values may be used to create the "largest drive index" row in the table shown in FIG. 10. The splits are sorted based on the largest drive index of the respective containing protection groups, in descending order, to generate adjusted spare split indices as indicated in step 510. The values may be used to create the "adjusted spare split index" row in the table shown in FIG. 10. The spare splits are assigned to the members on the failing/failed drive based on the adjusted spare split indices as indicated in step 512. The protection group members are relocated or rebuilt from the failing/failed drive to the assigned spare splits as indicated in step 514.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
   from a set of drives of a storage system, creating a drive subset of (D+P) plus spare sequentially indexed drives for implementation of protection groups that have D data members and P parity members, each of the drives having (D+P) sequentially indexed splits; and
   distributing spare capacity across multiple drives by creating a group of spare splits in which each split exhibits both split index and drive index diagonal adjacency such that diagonally adjacent pairs of the spare splits are characterized by both sequential split indices and sequential drive indices relative to each other by relocating selected protection group members to the spare drive such that no split index and no drive contain multiple spare splits.

2. The method of claim 1 comprising creating each of the protection groups using a single split index.

3. The method of claim 2 comprising adding a new drive to the drive subset and relocating selected protection group members characterized by split index and drive index adjacency to splits of the new drive.

4. The method of claim 3 comprising creating a new protection group using splits vacated by relocating the selected protection group members.

5. The method of claim 4 comprising relocating or rebuilding protection group members from a failing or failed one of the drives to the spare splits such that none of the drives contain multiple members of any of the protection groups.

6. The method of claim 5 comprising identifying the protection groups of the splits on the failing or failed drive.

7. The method of claim 6 comprising determining, for each identified protection group, the drives that contain the members of the protection group.

8. The method of claim 7 comprising determining a largest drive index for each identified protection group.

9. The method of claim 8 comprising calculating adjusted spare split indices to which the protection group members from the failing or failed one of the drives are relocated or rebuilt by using the largest drive index to select a split index that is used as the adjusted spare split index for the member of the protection group associated with the largest drive index.

10. An apparatus, comprising:
    a plurality of non-volatile drives;
    a plurality of interconnected compute nodes that manage access to the drives; and
    a drive manager configured to create a drive subset of (D+P) plus spare sequentially indexed using selected ones of the drives for implementation of protection groups that have D data members and P parity members, each of the selected drives having (D+P) sequentially indexed splits; and
    distribute spare capacity across multiple drives by creating a group of spare splits in which each split exhibits both split index and drive index diagonal adjacency such that diagonally adjacent pairs of the spare splits are characterized by both sequential split indices and sequential drive indices relative to each other by relocating selected protection group members to the spare drive such that no split index and no drive contain multiple spare splits.

11. The apparatus of claim 10 wherein the drive manager is configured to create each of the protection groups using a single split index.

12. The apparatus of claim 11 wherein a new drive is added to the drive subset and the drive manager is configured to relocate selected protection group members characterized by split index and drive index adjacency to splits of the new drive.

13. The apparatus of claim 12 wherein the drive manager is configured to create a new protection group using splits vacated by relocating the selected protection group members.

14. The apparatus of claim 13 wherein the drive manager is configured to relocate or rebuild protection group members from a failing or failed one of the drives to the spare splits such that none of the drives contain multiple members of any of the protection groups.

15. The apparatus of claim 14 wherein the drive manager is configured to identify the protection groups of the splits on the failing or failed drive.

16. The apparatus of claim 15 wherein the drive manager is configured to determine, for each identified protection group, the drives that contain the members of the protection group.

17. The apparatus of claim 16 wherein the drive manager is configured to determine a largest drive index for each identified protection group.

18. The apparatus of claim 17 wherein the drive manager is configured to calculate adjusted spare split indices to which the protection group members from the failing or failed one of the drives are relocated or rebuilt by using the largest drive index to select a split index that is used as the adjusted spare split index for the member of the protection group associated with the largest drive index.

19. A non-transitory computer-readable storage medium storing instructions that when executed by a computer cause the computer to perform a method for using a computer system to create spares, the method comprising:
    from a set of drives of a storage system, creating a drive subset of (D+P) plus spare sequentially indexed drives for implementation of protection groups that have D data members and P parity members, each of the drives having (D+P) sequentially indexed splits; and
    distributing spare capacity across multiple drives by creating a group of spare splits in which each split exhibits both split index and drive index diagonal adjacency such that diagonally adjacent pairs of the spare splits are characterized by both sequential split indices and sequential drive indices relative to each other by relocating selected protection group members to the spare drive such that no split index and no drive contain multiple spare splits.

20. The non-transitory computer-readable storage medium of claim 19 wherein the method further comprises calculating adjusted spare split indices to which protection group members from a failing or failed one of the drives are relocated or rebuilt by using a largest drive index to select a split index that is used as an adjusted spare split index for the member of the protection group associated with the largest drive index.

\* \* \* \* \*